March 27, 1934.  B. BEDFORD  1,952,528
METHOD OF MAKING MOLDED ARTICLES
Filed Feb. 27, 1930   2 Sheets-Sheet 1
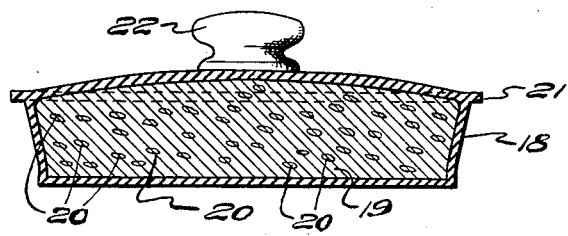
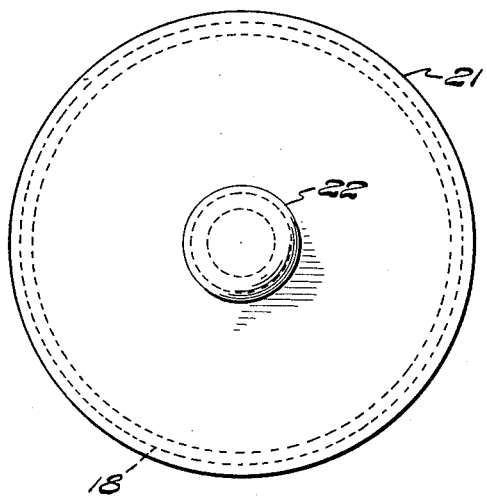
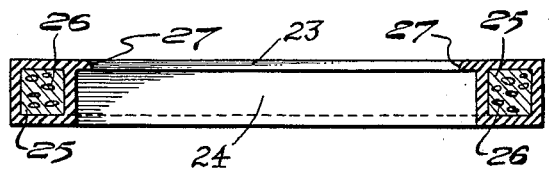
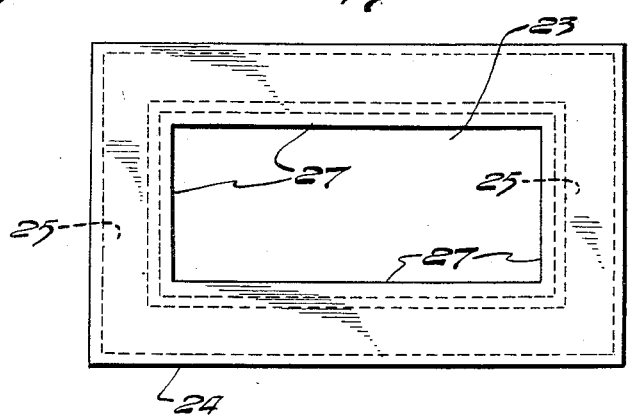
Inventor
BRUCE BEDFORD
By James L. Norris
Attorney March 27, 1934.   B. BEDFORD   1,952,528
METHOD OF MAKING MOLDED ARTICLES
Filed Feb. 27, 1930   2 Sheets-Sheet 2

Inventor
BRUCE BEDFORD
By
Attorney

Patented Mar. 27, 1934

1,952,528

UNITED STATES PATENT OFFICE 1,952,528

METHOD OF MAKING MOLDED ARTICLES

Bruce Bedford, Trenton, N. J.

Application February 27, 1930, Serial No. 431,901

2 Claims. (Cl. 18—59)

The invention relates to a method of manufacturing a molded article possessing high insulating properties and comprising an integral impervious casing of hard rubber otherwise known as ebonite, the interior being filled with insulating material, preferably of a porous spongy nature, such as cork, from which all the air has been removed. Such articles may be constructed in different forms, according to the uses to which they are to be put, and have been successfully utilized as lids for ice cream cabinets, for insulating door frames, and in other relations where high insulating properties are necessary or desirable.

According to the preferred method of manufacture, a coating of rubber is molded about a core of cork or similar porous spongy material, such coating being continuous and integral, and extending over the entire surface of the interior slab of cork. The coated slab within the mold is then subjected to heat and pressure, the heat being sufficient to render the rubber fluent, and the pressure being sufficient to force the air out of the cork. Subsequently expansion of the cork is allowed to take place while the cork is entirely covered with the impervious rubber coating, the result being that vacuum spaces exist within the body of the cork in place of the air, thus producing an article having improved insulating properties.

The above is a brief description of the improved article and a preferred method of manufacture, but the invention will be more readily understood by reference to the accompanying drawings and more detailed description which will follow hereinafter.

In the drawings,

Fig. 1 is a transverse sectional view of an ice cream cabinet lid formed in accordance with my invention;

Fig. 2 is a top plan view of the same;

Fig. 3 is a sectional view of a sliding door frame constructed in accordance with my invention;

Fig. 4 is an elevation of the same; and

Figure 5:
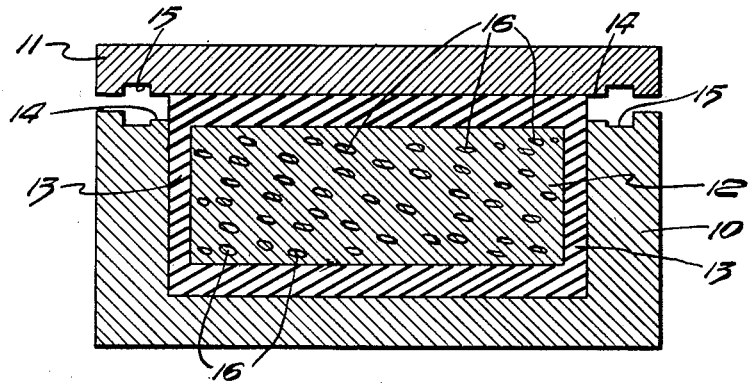
Figs. 5, 6 and 7 are diagrammatic sectional views showing a mold within which the improved article is formed, the three figures illustrating successive steps in the manufacture of the article.
Figure 6:
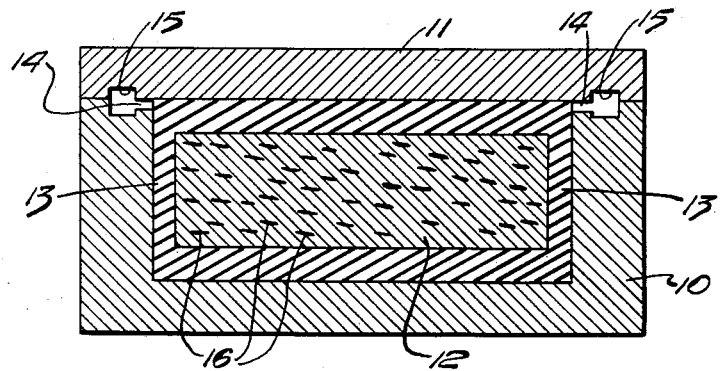
Figure 7:
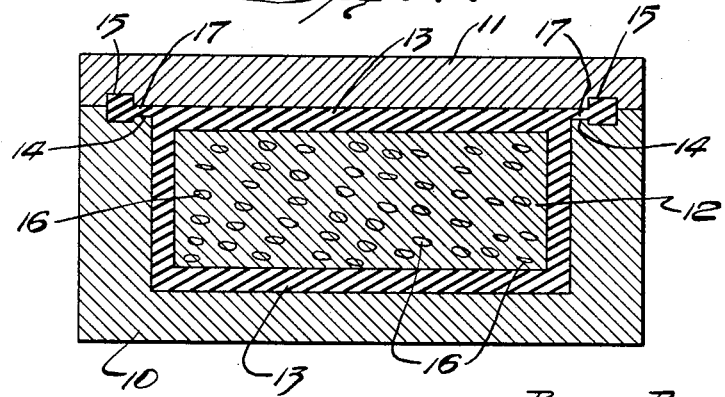

Referring first to Figs. 5, 6 and 7, the reference numeral 10 denotes the bottom portion of a mold, and the numeral 11 a separate upper portion of the same mold, used for the production of my improved rubber coated insulating article. A cork slab 12, is first placed within the lower section 10 of the mold, with the rubber in plastic condition, and around the slab so as to completely cover all portions of the central cork core, this rubber being in an amount in excess of that which will be present in the completed article.

The upper section 11 of the mold is placed in the position illustrated in Fig. 5, and pressure is then applied, producing compression of the cork core to the reduced size indicated in Fig. 6. All or a substantial portion of the air previously included within the cork core escapes through the split 14 in the mold, to the outer atmosphere. The rubber, during this stage of the process, flows only to a sufficient degree to permit the escape of air.

Heat is now applied sufficient to cause the rubber to become soft, and to flow freely. This results in the excess of rubber flowing through the split 14 in the mold to the overflow space 15, being forced out partly by the expansion of the compressed cork core 12. The cork returns approximately to its original size, due to the resiliency or spring of the cork, which is sufficient to force the excess of flowing rubber out of the form and into the overflows. When this operation is completed, the temperature is again raised, and the curing process is started.

When the curing is completed, the cork core is entirely surrounded by a permanent impervious integral coating of hard rubber, and vacuum spaces indicated at 16 take the place of the air previously within the cork slab. Preferably a rim 17 is formed integral with the rubber coating or casing 13.

By the process above described, it is possible to produce an article which possesses higher insulating properties than those commonly in use. The cork core is entirely surrounded by the impervious outer coating, so that it is impossible for air to enter and fill the vacuum spaces. The process is simple and results in marked savings in the cost of manufacture, as well as producing an improved article.

The molded article of manufacture may be employed for various uses, several of which are illustrated in Figs. 1 to 4. Fig. 1 shows an ice cream cabinet lid comprising in outer rubber casing 18, which entirely covers a cork core 19 having vacuum spaces 20 within the same. A flange 21 is formed integral with the rubber casing 18, and provides a rest for the lid. A suitable handle 22, which may be of hard rubber or other desired material, is attached to the lid.

In Figs. 3 and 4, the invention is shown as applied to a sliding door frame which surrounds a central portion 23. The frame possesses insulating properties, and comprises a casing 24, preferably of hard rubber, which completely surrounds the insulating core 25, of cork or light spongy material, having vacuum spaces 26 therewithin, or other insulating materials. One or more flanges 27 may be formed integrally with the casing 24 to form a backing for the glass or other material used to close the space 23.

Obviously the invention is capable of other modifications, those described being merely illustrative of the broad utility of the device.

The idea of molding rubber entirely around an insulating core, preferably of cork or like spongy material, in one integral piece, thereby eliminating any possibility of air or moisture coming in contact with the core, is believed to be one of the important features of the present invention.

What is claimed is:

1. A method of making a molded article of manufacture having an imperforate air and moisture impervious hard rubber casing and a cork spongy porous core having vacuum spaces therewithin, which comprises completely surrounding a cork core in a mold with a plastic hard rubber composition, applying pressure sufficient to compress the cork core and to remove the air therefrom, heating the rubber casing sufficiently to render the same fluid, and at the same time permitting the cork to expand, whereby a vacuum occupies the spaces previously occupied by air, then curing the rubber casing and allowing the same to harden about said expanded core.

2. A method of forming an insulating block having an imperforate air and moisture impervious outer casing and a spongy core having vacuum spaces therewithin, which comprises completely surrounding a spongy core within a mold with plastic casing impervious to air, applying pressure sufficient to compress the core and to remove the air therefrom, heating the casing sufficiently to render the same fluid, and at the same time permitting the core to expand, whereby a vacuum occupies the spaces previously occupied by air, then allowing the casing to harden about the said expanded core.

BRUCE BEDFORD.